United States Patent [19]
Osterhout

[11] Patent Number: 5,313,557
[45] Date of Patent: May 17, 1994

[54] PEN RECORDER

[75] Inventor: Ralph Osterhout, San Francisco, Calif.

[73] Assignee: Machina, San Francisco, Calif.

[21] Appl. No.: 809,172

[22] Filed: Dec. 17, 1991

[51] Int. Cl.$^5$ .............................................. G11C 11/34
[52] U.S. Cl. ..................................... 395/2.81; 369/64
[58] Field of Search ...................................... 381/27, 18

[56] References Cited

U.S. PATENT DOCUMENTS

| | | | |
|---|---|---|---|
| 3,937,939 | 2/1976 | Frenkel | 364/708.1 |
| 3,971,141 | 7/1976 | Wilson | 434/308 |
| 4,791,741 | 12/1988 | Kondo | 395/2.81 |
| 4,949,327 | 8/1990 | Forsse et al. | 369/58 |
| 4,969,180 | 11/1990 | Watterson et al. | 379/58 |

Primary Examiner—Michael R. Fleming
Assistant Examiner—Richard J. Kim
Attorney, Agent, or Firm—Townsend and Townsend Khourie and Crew

[57] ABSTRACT

A pen recorder comprises a hollow pen body having a proximal end and a distal end a solid state audio recorder in its interior. A retractable pen mechanism is mounted on the distal end of the pen body, and a microphone transducer and speaker transducer are mounted at the proximal end. The speaker transducer is transversely mounted across an open proximal end of the pen body so that the interior of the pen body acts as a resonator improving the sound quality of the speaker.

6 Claims, 4 Drawing Sheets

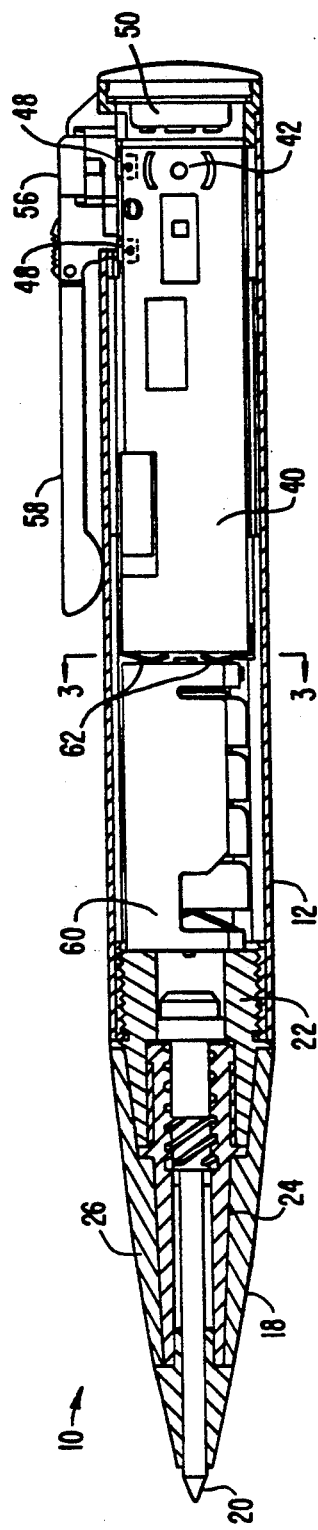
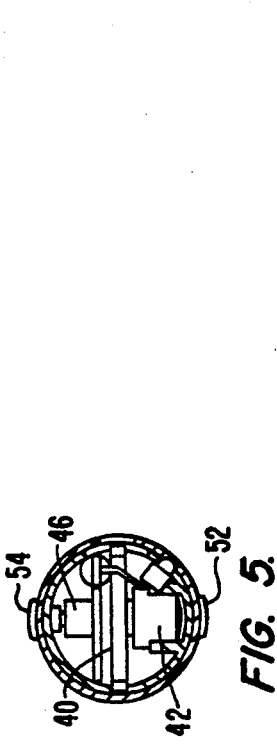
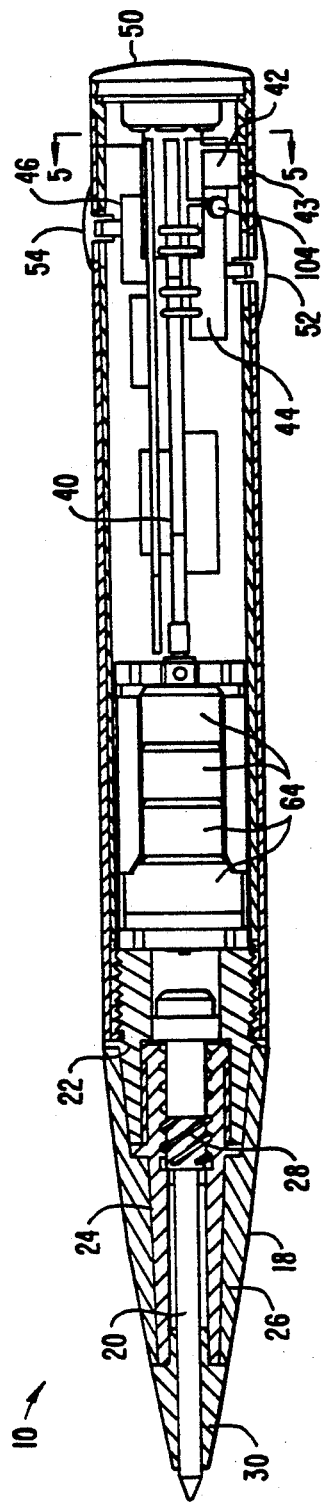

PEN RECORDER

BACKGROUND OF THE INVENTION

1. Field of the Invention

The present invention relates generally to audio recording and playback apparatus. More particularly, the present invention comprises a pen mechanism having an integral solid state audio recorder with separate microphone and speaker transducers at a proximal end thereof.

A variety of devices have been used over the years for keeping notes and short messages for reference at a later time. Most simply, many individuals carry paper notepads on which they can write short messages as the need or desire arises. Although suitable for many purposes, the need to stop, find a writing surface, take out the notepad, take out a separate pen, and the like, can at times be inconvenient.

In many cases, it would be more desirable to simply record an audio message on a conveniently transportable device. Portable recording devices have long been available, typically in the form of small, portable dictating machines which utilize magnetic recording tape. While again very useful for many purposes, such dictating machines can be relatively bulky (the need to incorporate a tape cartridge limits the minimum size of the units) and are usually not routinely carried around by individuals.

Therefore, it would be desirable to provide recording devices which are even more portable and which can be carried by user as a matter of routine. It would be particularly desirable if such recording devices served a dual purpose, such as being in the form of a pen which incorporates an audio recording mechanism.

2. Description of the Background Art

U.S. Pat. No. 4,969,180, discloses a pen having a side speaker at one end and a side microphone at the other end. The design is intended to permit a user to hold the pen in the manner of a conventional telephone hand set U.S. Pat. No. 4,791,741, comprises a solid state recorder in a flat card. The structure permits placement of a relatively large speaker transducer. U.S. Pat. Nos. 3,971,141 and 4,949,327, describe other apparatus which permit audio recording and playback.

SUMMARY OF THE INVENTION

According to the present invention, a pen recorder comprises a hollow pen body having a proximal end and a distal end. A solid state audio recorder is disposed within the interior of the hollow pen body and includes input connections, output connections, and control connections. A microphone transducer is disposed at the proximal end of the hollow pen body and is connected to the solid state audio recorder through the input connections. A separate speaker transducer is also disposed at the proximal end of the hollow pen body, usually on the distal side of the speaker transducer, and is connected to the output connections on the solid state audio recorder. Switch means are provided on the pen body and connected to the control connections on the solid state recorder for selecting between record and playback functions. A pen mechanism is disposed at the distal end of the hollow pen body.

In a preferred aspect, the speaker transducer comprises a rare earth permanent magnet transducer element which is disposed transversely across the proximal tip of a hollow pen body. Usually, the pen body is cylindrical having an open proximal end, and the transducer element has a diameter which is generally equal to the opening so that the area of the speaker is maximized. By thus orienting the speaker transducer, the pen body acts as a resonator and the quality of the audio playback is significantly improved.

In a second preferred aspect of the present invention, the microphone transducer is located just distally of the speaker element disk and opens through a small aperture in the side of the hollow pen body.

In a third preferred aspect of the present invention, a pen mechanism comprises a retractable pen cartridge, usually being present in a single assembly having means for connecting the assembly to the distal end of the pen body, wherein the pen cartridge may be advanced or retracted by twisting the assembly relative to the pen body.

In a fourth preferred aspect of the present invention, the switch means comprises a first switch element which selects between off, record, and play modes of the solid state recorder. A second switch element is also provided which selects between at least two separate recording channels of the solid state recorder, and a third switch element is provided which selects between a pause mode and the record and play modes of the solid state recorder.

BRIEF DESCRIPTION OF THE DRAWINGS

FIG. 2 is a side elevational view of the pen recorder of FIG. 1, shown in cross-section.

FIG. 3 is a cross-sectional view of the pen recorder taken along line 3—3 of FIG. 2.

FIG. 4 is a top elevational view of the pen recorder of FIG. 1, shown in cross-section.

FIG. 5 is a cross-sectional view of the pen recorder taken along line 5—5 of FIG. 4.

DESCRIPTION OF THE PREFERRED EMBODIMENT

Figure 1:
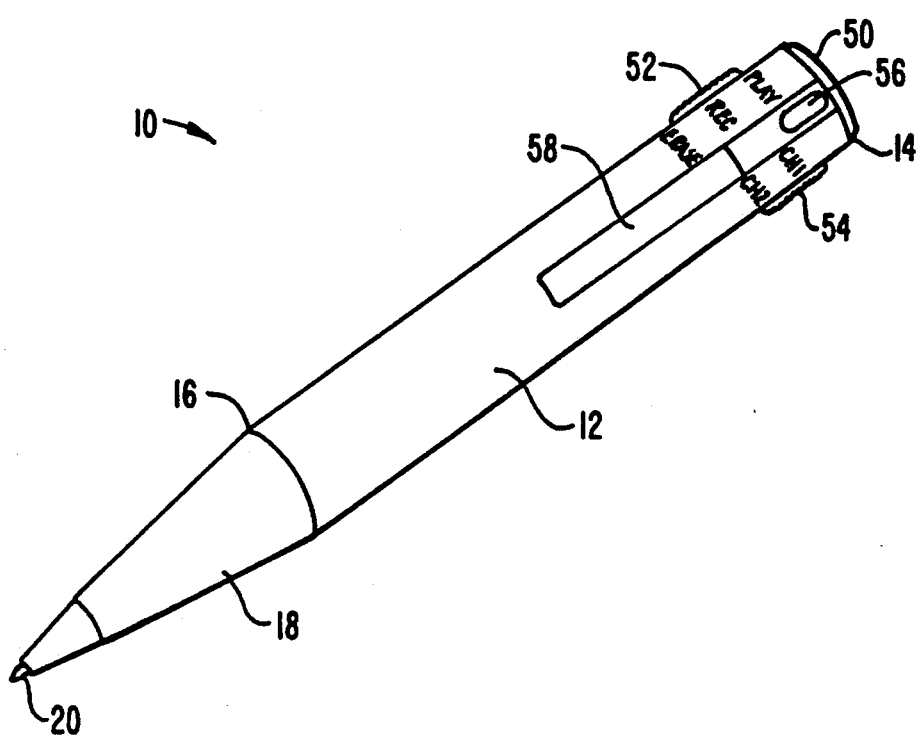
FIG. 1 is a perspective view of a pen recorder constructed in accordance with the principles of the present invention.

Referring to FIGS. 1-5, a pen recorder 10 comprises a hollow pen body 12 having a proximal end 14 and a distal end 16. A pen mechanism 18 is threadably secured to the distal end of the pen body 12 and includes a retractable pen cartridge 20. Pen mechanism 18 is self-contained and includes a fixed cylinder 22 which is threadably secured within the pen body 12, and an axially translatable nose cone 24 which is mounted within the fixed cylinder 22. A gripping surface 26 is formed over the nose cone 24 and is the portion which is held in the user's hand while writing A helical mounting shaft 28 secures the nose cone 24 to the cylinder 22 and permits axial translation of the nose cone relative to the cylinder by simple twisting of the nose cone. In this way, a tip element 30 can be actually translated past the fixed pen cartridge 20 in order to retract or expose the pen cartridge.

A printed circuit board 40 is mounted in the proximal half of the pen body 12 and includes a microphone transducer 42, a first switch 44, a second switch 46, and a third switch 48 mounted thereon. A speaker transducer 50 is mounted on the board 40 and disposed at the proximal end of the pen body 12. The speaker 50 has a diameter which is approximately equal to the cylindrical diameter of the pen body 12. The printed circuit board carries other circuitry components as necessary for providing the solid state recorder of the present invention, as described in more detail in reference to FIGS. 6 and 7 hereinafter.

A first switch actuator 52 is mounted on the exterior surface of pen body 12 and connected to the first switch element 44, as best observed in FIG. 4. A second switch actuator 54 is mounted on the pen body 12 on the side opposite to that of first switch actuator 52, and is connected to the second switch element 46, as also seen in FIG. 4. A third switch actuator 56 is mounted at the top of a clip assembly 58 which is secured near the proximal end of the pen body 12. The first switch actuator 52 may be axially translated between a play, record, and off or erase position, as illustrated in FIG. 1. The second switch actuator 54 may be axially translated between a first channel position and a second channel position, also as can be seen in FIG. 1. The third switch actuator 56 is a push-button which can be pressed to actuate recording or playback functions, or can be released to stop recording. The next time the button is depressed to record, the previously recorded information will be erased.

A battery cartridge 60 is disposed in the hollow pen body 12 and connects to the printed circuit board 40 through spring connectors 62. The battery cartridge 60 includes plurality of individual batteries 64 (best observed in FIG. 4) which can be replaced by removing the pen mechanism 18, withdrawing the battery cartridge 60, and thereafter replacing the individual batteries 64.

Figure 6:
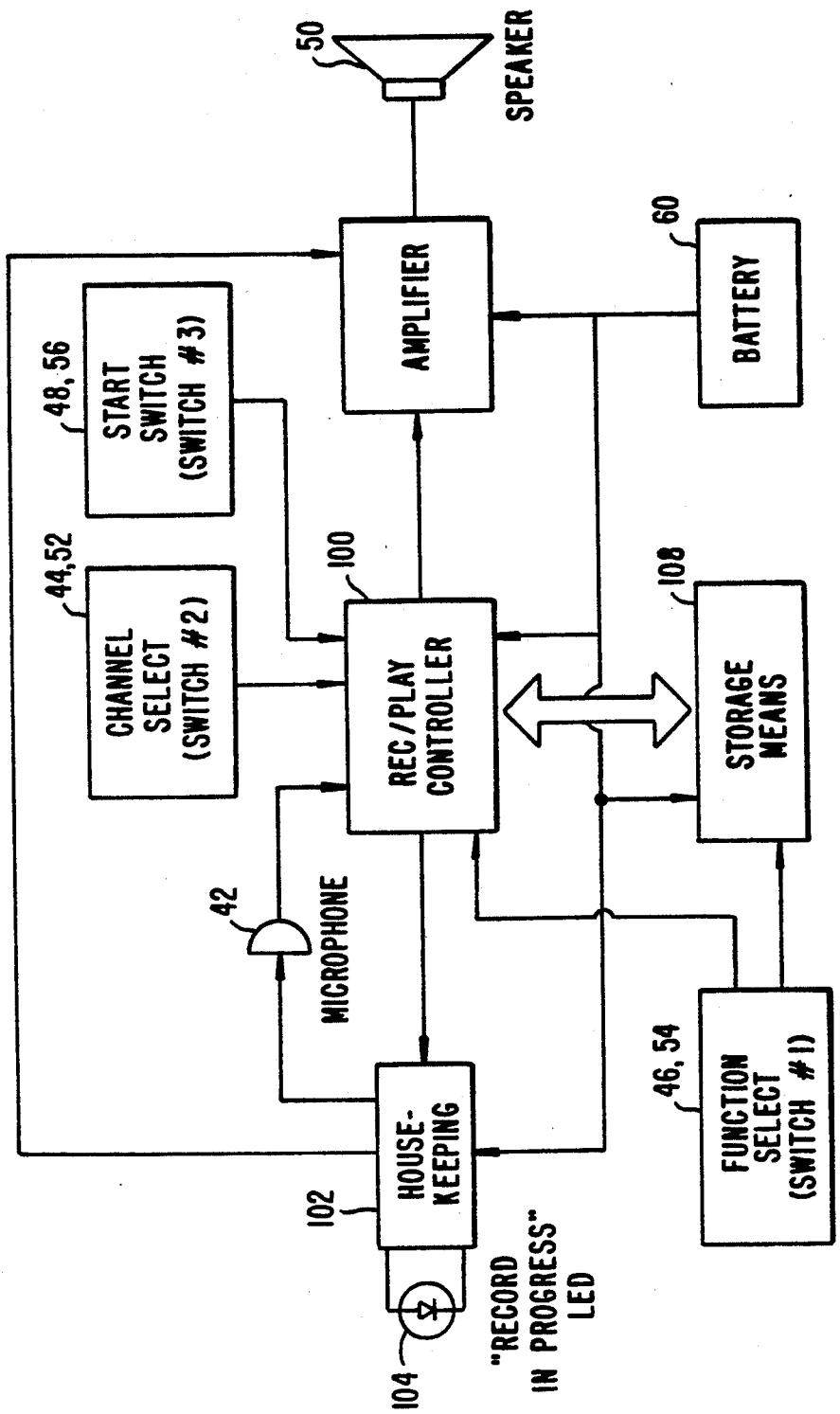
FIG. 6 is a block diagram illustrating the microphone, speaker, and control circuitry of the pen recorder of the present invention.
Figure 7:
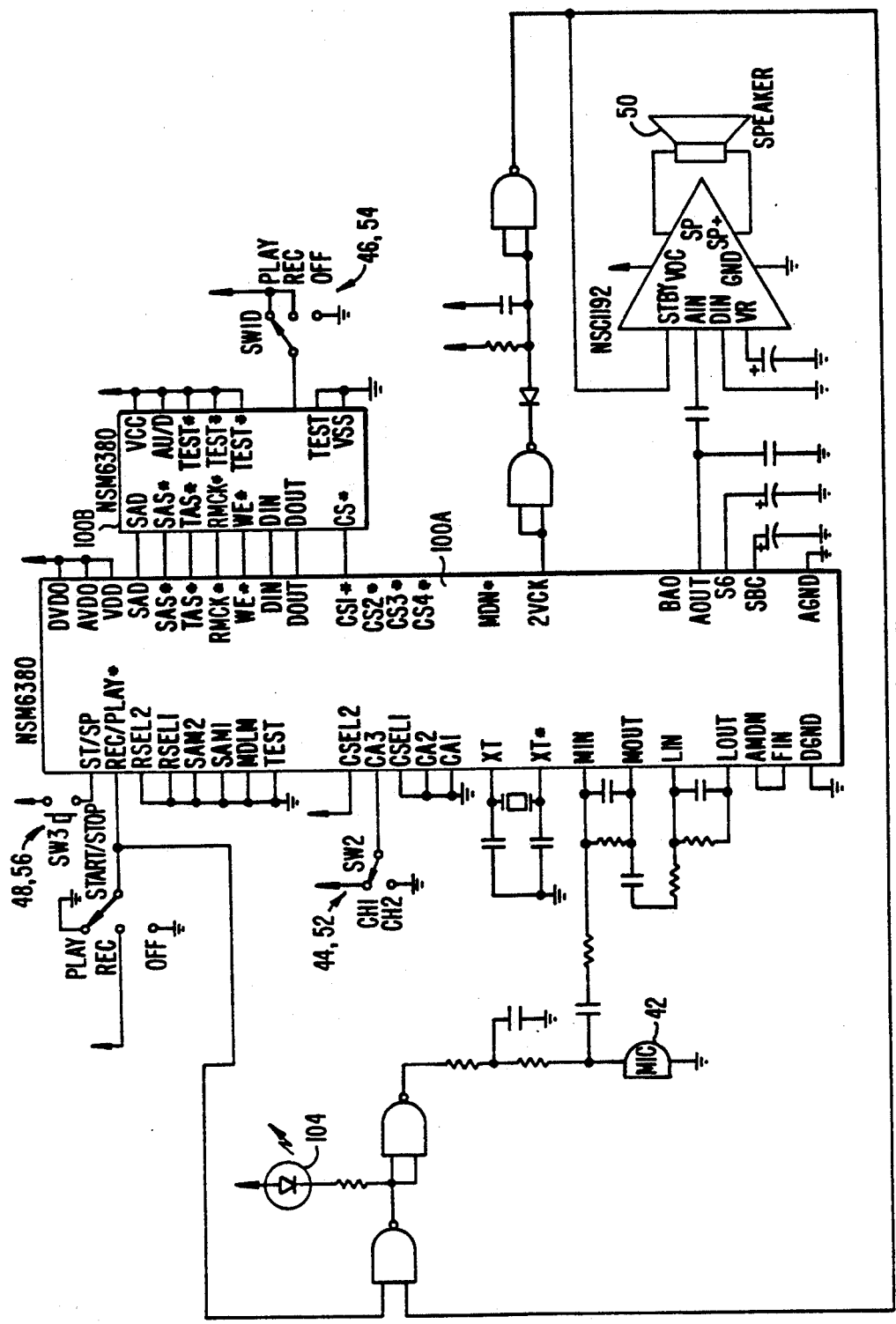
FIG. 7 is a more detailed circuit diagram illustrating the connections to the solid state microprocessors which comprise the recorder of the present invention.

Referring now to FIGS. 6 and 7, record and playback circuitry 100 is mounted on the printed circuit board 18, typically in the form of a digital audio recorder chipset, such as, a MSM 6388 (voice chip) 100A, a MSM 6389 (serial register) 100B, and a MSC 1192 (audio amplifier) 100C, available from Oki Semiconductors, Tokyo, Japan. The selector switch 44 and switch actuator 52 feed directly into the voice chip 100A, as do the function selector switch 46 and switch actuator 54 and the stop/start switch 48 and actuator 56. Microphone 42 is connected to the record playback circuitry 100 as well as to auxiliary circuitry 102 which actuates an LED (light-emitting diode) 104 during the playback and/or record functions.

The detailed connections of the voice chip 100A, serial register 100B, and audio amplifier 100C are illustrated in FIG. 7. Standard electrical circuit symbols are used for this figure, and one skilled in the art would be expected to be able to reproduce the exact circuitry utilized by the preferred embodiment of the present invention based on this diagram.

Although the foregoing invention has been described in detail for purposes of clarity of understanding, it will be obvious that certain modifications may be practiced within the scope of the appended claims.

What is claimed is:

1. A pen recorder comprising:
   a hollow body having a proximal end and a distal end;
   a solid state audio recorder disposed within the hollow body and having input connections, output connections, and control connections;
   a microphone transducer disposed at the proximal end of the body and being connected to the input connections of the solid state audio recorder;
   a speaker transducer disposed traversely across a the proximal end of the hollow body and being connected to the output connections of the solid state audio recorder, whereby the hollow body acts as a resonator for the speaker;
   a switch means disposed at the proximal end of the hollow body and being connected to the control connections of the solid state audio recorder, whereby record and playback functions of the recorder can be selected; and
   a pen mechanism disposed at the distal end of the hollow body.

2. A pen recorder as in claim 1, wherein the speaker transducer comprises a permanent magnetic transducer element.

3. A pen recorder as in claim 2, wherein the microphone transducer is exposed through an aperture in the side of the hollow body.

4. A pen recorder as in claim 1, wherein the pen mechanism comprises a retractable pen cartridge.

5. A pen recorder as in claim 4, wherein the pen mechanism comprises a single assembly having means for connection to the distal end of the pen body, wherein the pen cartridge may be advanced or retracted by twisting the assembly relative to the hollow body.

6. A pen recorder as in claim 1, wherein the switch means comprises a first switch element which selects between off, record, and play modes; a second switch element which selects between at least two recording channels, and a third switch element which selects between stop and record or play.

* * * * *